June 16, 1925.
J. M. KIRKPATRICK
VALVE FOR INNER TUBES
Filed April 25, 1924
1,542,704
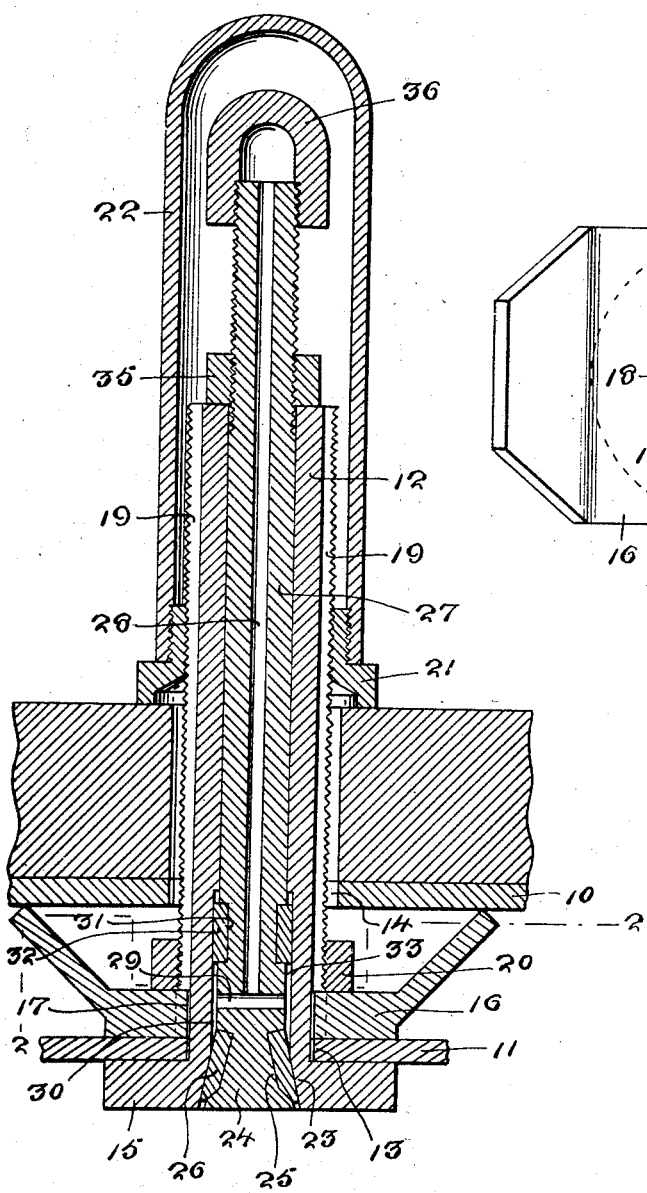
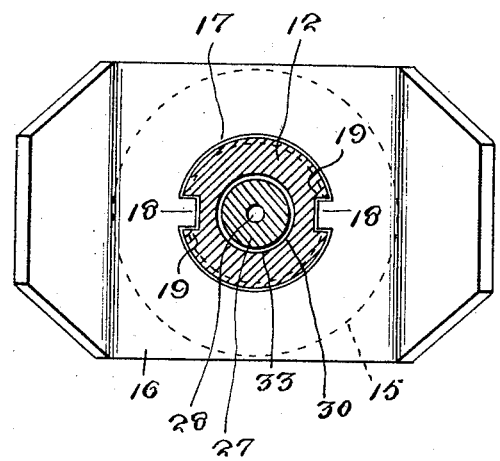
J. M. Kirkpatrick
INVENTOR
BY Victor J. Evans
ATTORNEY
WITNESS:

Patented June 16, 1925.

1,542,704

UNITED STATES PATENT OFFICE.

JOHN M. KIRKPATRICK, OF ANACONDA, MONTANA.

VALVE FOR INNER TUBES.

Application filed April 25, 1924. Serial No. 709,008.

*To all whom it may concern:*

Be it known that I, JOHN M. KIRKPATRICK, a citizen of the United States, residing at Anaconda, in the county of Deerlodge and State of Montana, have invented new and useful Improvements in Valves for Inner Tubes, of which the following is a specification.

This invention relates to improvements in valves for inner tubes of pneumatic tires and the like and has for an object the provision of a valve through which air may be inserted into the tube and held against escaping, without the use of springs.

Another object of the invention is the provision of a valve having means for positively forcing the valve member into engagement with the valve seat, the area of such engagement acting to eliminate slow leaks.

Another object of the invention is the provision of means for conveniently and effectually securing a valve of the above character to a tube.

With the above and other objects in view, the invention further includes the following novel features and details of construction, to be hereinafter more fully described, illustrated in the accompanying drawings and pointed out in the appended claim.

In the drawings:—

Figure 1 is a longitudinal sectional view illustrating the use of the valve.

Figure 2 is a section on the line 2—2 of Figure 1.

Referring to the drawings in detail wherein like characters of reference denote corresponding parts, the valve is shown as arranged for use and for this purpose there is illustrated a fragmentary portion of the rim 10 of an automobile wheel and a portion of an inner tube 11.

The valve comprises a casing 12 which is exteriorly threaded and which extends through an opening 13 provided in the tube 11 and through an opening 14 in the rim 10. This casing 12 is provided at its inner end with a laterally extending flange 15 which is adapted to engage the inner wall of the tube 11, while a clamping plate 16 engages the outside of the said tube. This plate 16 is provided with an opening 17 for the passage of the casing 12, while extending within this opening are oppositely located lugs 18 which enter recesses 19 provided in the valve casing and act to prevent relative rotary movement. A nut 20 which is threaded upon the casing 12 bears upon the outer face of the clamping plate 16 so as to securely hold the tube between the flange 15 and the said plate. A nut 21 is also threadedly mounted upon the casing 12 and engages the felly 10′, while a cap 22 has a threaded engagement with this nut so as to enclose the valve in the usual well known manner.

The bore of the casing 12 is provided at its inner end with an outwardly flared seat 23, while located within the casing is a similarly shaped valve member 24. This member is provided with an annular seat or recess 25 for the reception of a gasket 26, the latter being adapted to be forced into engagement with the seat 23 in a manner to be hereinafter explained. The inner edge of the gasket 26 extends slightly beyond the periphery of the valve member so that pressure of air within the tube will have a tendency to force this gasket into engagement with the seat 23. Extending from the valve member 24 is a stem 27, the latter extending upwardly beyond the outer end of the casing 12 and having a longitudinal bore 28, therethrough. The inner end of this bore extends laterally through the stem as shown at 29 and opens into a preferably enlarged portion 30 of the casing bore the opening being slightly spaced outward from the outer edge of the gasket 26. The valve stem 27 is provided with an annular seat 31 which receives a gasket 32, the latter being positioned upon the opposite side of the open end 29 of the bore 28 so that an air chamber 33 is provided whose opposite ends are defined by the gaskets 26 and 32. The outer end of the stem 27 is exteriorly threaded and has mounted thereon a nut 35 which is adapted to engage the outer end of the valve casing so as to move the same longitudinally and force the gasket 26 into positive engagement with the seat 23, so that no spring or springs are required for this purpose. The outer end of the bore 28 of the valve stem is closed by a removable cap 36.

By slightly loosening the nut 35, air may be inserted into the tube through the valve in the usual manner, the pressure of air within the tube acting to force the gasket 26 to engage the valve seat 23 so as to prevent the escape of air. After the tube has been inflated to the desired pressure, the nut 35 is adjusted to positively seat the valve member and due to the area of the valve seat and the gasket 26, slow leaks are prevented. Air which enters the tube through the pocket 33 is prevented by the gasket 32 from passing outward.

The invention is susceptible of various changes in its form, proportions and minor details of construction and the right is herein reserved to make such changes as properly fall within the scope of the appended claim.

Having described the invention what is claimed is:—

In a tire valve, the combination of a casing having a tapered valve seat, a tapered valve member movable rectilinearly in the casing and having a longitudinal bore extending through and beyond the outer end of the casing and a lateral bore and a chamber in its side and communicating with the said lateral bore, gaskets carried by the valve and arranged at opposite sides of the chamber, and a nut on the valve and opposed to the casing.

In testimony whereof I affix my signature.

JOHN M. KIRKPATRICK.